United States Patent
Nagelvoort et al.

[11] Patent Number: 5,960,644
[45] Date of Patent: *Oct. 5, 1999

[54] REMOVING CARBON DIOXIDE, ETHANE AND HEAVIER COMPONENTS FROM A NATURAL GAS

[75] Inventors: Robert Klein Nagelvoort; Gary Alan Robertson, both of The Hague, Netherlands

[73] Assignee: Shell Oil Company, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/869,899

[22] Filed: Jun. 5, 1997

[30] Foreign Application Priority Data

Jun. 5, 1996 [EP] European Pat. Off. ............... 96201560

[51] Int. Cl.[6] ........................................................ F25J 3/00
[52] U.S. Cl. .............................................. 62/622; 62/929
[58] Field of Search ............................... 62/622, 929, 621

[56] References Cited

U.S. PATENT DOCUMENTS

| | | | |
|---|---|---|---|
| 4,097,250 | 6/1978 | Pagani et al. | 62/929 |
| 4,115,086 | 9/1978 | Jordan et al. | 62/622 |
| 4,274,850 | 6/1981 | Becker . | |
| 4,444,577 | 4/1984 | Perez . | |
| 4,451,274 | 5/1984 | O'Brien | 62/929 |
| 4,666,483 | 5/1987 | Gauthier | 62/622 |
| 4,675,036 | 6/1987 | Bauer | 62/622 |
| 4,676,812 | 6/1987 | Kummann | 62/622 |

*Primary Examiner*—Ronald C. Capossela

[57] ABSTRACT

A method is provided for removing carbon dioxide, ethane and heavier components from high pressure natural gas (10) comprises: partly condensing and expanding the high pressure natural gas (10) to obtain a gaseous stream (30) enriched in methane and carbon dioxide and two liquid streams (37 and 40) enriched in ethane and heavier components which are introduced into fractionation column (35); removing from fractionation column (35) fluid stream (45), heating (46) the fluid stream to obtain a reboiling stream (47) which is introduced into the fractionation column (35); removing from fractionation column (35) liquid stream (50) enriched in carbon dioxide, ethane and heavier components; removing from the top of fractionation column (35) a gaseous overhead stream (55) enriched in methane; cooling (56) the gaseous overhead stream (55) to obtain a two-phase fluid, separating (58) the two-phase fluid into cooled gaseous overhead stream (60) and first reflux stream (62) which is introduced into the fractionation column (35); and expanding (65) the cooled gaseous overhead stream (60) to obtain a two-phase fluid at low pressure, separating (69) the two-phase fluid into gaseous product stream (70) and second reflux stream (72) which is introduced into the top of the fractionation column (35).

10 Claims, 2 Drawing Sheets

REMOVING CARBON DIOXIDE, ETHANE AND HEAVIER COMPONENTS FROM A NATURAL GAS

FIELD OF THE INVENTION

The present invention relates to a method of removing carbon dioxide, ethane and heavier components from a high pressure natural gas stream comprising methane, carbon dioxide, ethane and heavier components. In particular the present invention relates to such a method in which the natural gas contains a relatively large amount of carbon dioxide, up to about 5 mol percent.

BACKGROUND TO THE INVENTION

U.S. Pat. No. 4,444,577 suggests a method for removing carbon dioxide, ethane and heavier components from a high pressure natural gas stream comprising methane, carbon dioxide, ethane and heavier components, which method comprises: (a) partly condensing and expanding the high pressure natural gas stream to obtain a stream enriched in methane and carbon dioxide and at least one liquid stream enriched in ethane and heavier components; (b) introducing the stream enriched in methane and carbon dioxide at fractionation pressure into a fractionation column which includes a plurality of fractionation stages; (c) introducing the liquid stream(s) at fractionation pressure into the fractionation column at a level which is below the level of introducing the stream enriched in methane and carbon dioxide; (d) removing from the fractionation column, below the level of introducing the liquid stream(s), at least one fluid stream, heating the fluid stream(s) to obtain reboiling stream (s), and introducing the reboiling stream(s) into the fractionation column; (e) removing from the bottom of the fractionation column a liquid stream enriched in carbon dioxide, ethane and heavier components; and (f) removing from the top of the fractionation column a gaseous overhead stream enriched in methane.

In the known method the gaseous overhead stream is partly condensed to obtain a gaseous product stream which is enriched in methane and a liquid stream which is introduced as reflux into the top of the fractionation column. Partly condensing the gaseous overhead stream is done by expanding the gaseous overhead stream to a low pressure in an expansion engine in the form of a turbine expander. Downstream of the turbine expander, the expanded and cooled overhead stream is separated into a gaseous product stream and a liquid stream, and this liquid stream is introduced into the top of the fractionation column as a reflux stream. By expanding the gaseous overhead stream, the overhead stream is sufficiently cooled to achieve condensation of ethane and heavier components which were entrained in the gaseous overhead stream. The expansion is done to a pressure below the fractionation pressure prevailing in the fractionation column, and therefore the reflux stream has to be pumped to the fractionation column.

The known method had been developed to treat natural gas containing carbon dioxide to about 0.6 mol percent, so that no upstream carbon dioxide removal step is required.

Applicant had found that when the natural gas contains a larger amount of carbon dioxide, carbon dioxide in the turbine expander can freeze and this freezing will cause operational problems.

SUMMARY OF THE INVENTION

It is therefore an object of the present invention to provide a method of removing carbon dioxide, ethane and heavier components from a high pressure natural gas stream comprising methane, carbon dioxide, ethane and heavier components which is tolerant to high concentrations of carbon dioxide in the natural gas.

To this end the method of removing carbon dioxide, ethane and heavier components from a high pressure natural gas stream comprising methane, carbon dioxide, ethane and heavier components according to the present invention is characterized in that the method further comprises: (g) cooling the gaseous overhead stream at fractionation pressure to obtain a two-phase fluid, separating the two-phase fluid into a cooled gaseous overhead stream and a liquid stream, and introducing the liquid stream as a first reflux stream into the fractionation column at a level above the level of introducing the stream enriched in methane and carbon dioxide; and (h) expanding the cooled gaseous overhead stream to obtain a two-phase fluid at low pressure, separating the two-phase fluid into a gaseous product stream and a liquid stream, and introducing the liquid stream as a second reflux stream into the fractionation column at a level above the level of introducing the first reflux stream.

The present invention makes use of the fact that carbon dioxide dissolves in ethane. To remove a sufficiently large amount of carbon dioxide, the temperature to which the gaseous overhead stream is cooled is so selected that so much ethane condenses that a sufficiently large amount of carbon dioxide is removed with the condensing ethane. Carbon dioxide dissolved in the condensing ethane is returned to the fractionation column in the first reflux stream.

The natural gas stream comprises up to 5 mol percent of carbon dioxide, between 3 and 10 mol percent of ethane and up to 10 mol percent of heavier components, the balance being methane. Optionally the natural gas stream may further contain nitrogen.

The high pressure of the natural gas is suitably between 4.5 and 6.0 Mpa (absolute), the fractionation pressure is below the high pressure and suitably between 3.0 and 3.5 Mpa (absolute), and the low pressure is below the fractionation pressure and is suitably between 1.5 and 2.0 Mpa (absolute). The minimum value of the lower pressure is so selected that at the low temperatures associated with the low pressure and at the attained low concentration of carbon dioxide, freezing of carbon dioxide will not occur.

Suitably the second reflux stream is introduced into the top of the fractionation column.

When the column is provided with fractionation trays, a fractionation stage corresponds to one fractionation tray, and when the column is provided with packing (random or structured) a fractionation stage corresponds to a theoretical stage.

Where in the specification and in the claims a level of introducing a stream into the fractionation column is defined relative to introducing another stream, there is at least one fractionation stage between the two levels, the same applies to defining the level of removing a stream from the fractionation column. The top of the fractionation column is that part of the fractionation column which is located above the uppermost fractionation stage, and the bottom of the column is that part of the fractionation column which is located below the lowermost fractionation stage.

Suitably the gaseous product stream is used to cool by indirect heat exchange the gaseous overhead stream in step (g).

Applicant had furthermore found that the gaseous product stream can further be used to cool the natural gas stream upstream of the fractionation column. To obtain a very efficient exchange of heat, the gaseous overhead stream is used to cool by indirect heat exchange the stream enriched in methane and carbon dioxide at fractionation pressure before this stream is introduced into the fractionation column.

After this heat exchange, the gaseous product stream can further be used to cool by indirect heat exchange part of the high pressure natural gas stream.

The remainder of the high pressure natural gas stream can be cooled by indirect heat exchange with a refrigerant, and/or by indirect heat exchange with at least one of the at least fluid streams removed from the fractionation column in step (d).

DESCRIPTION OF A PREFERRED EMBODIMENT

Figure 1:
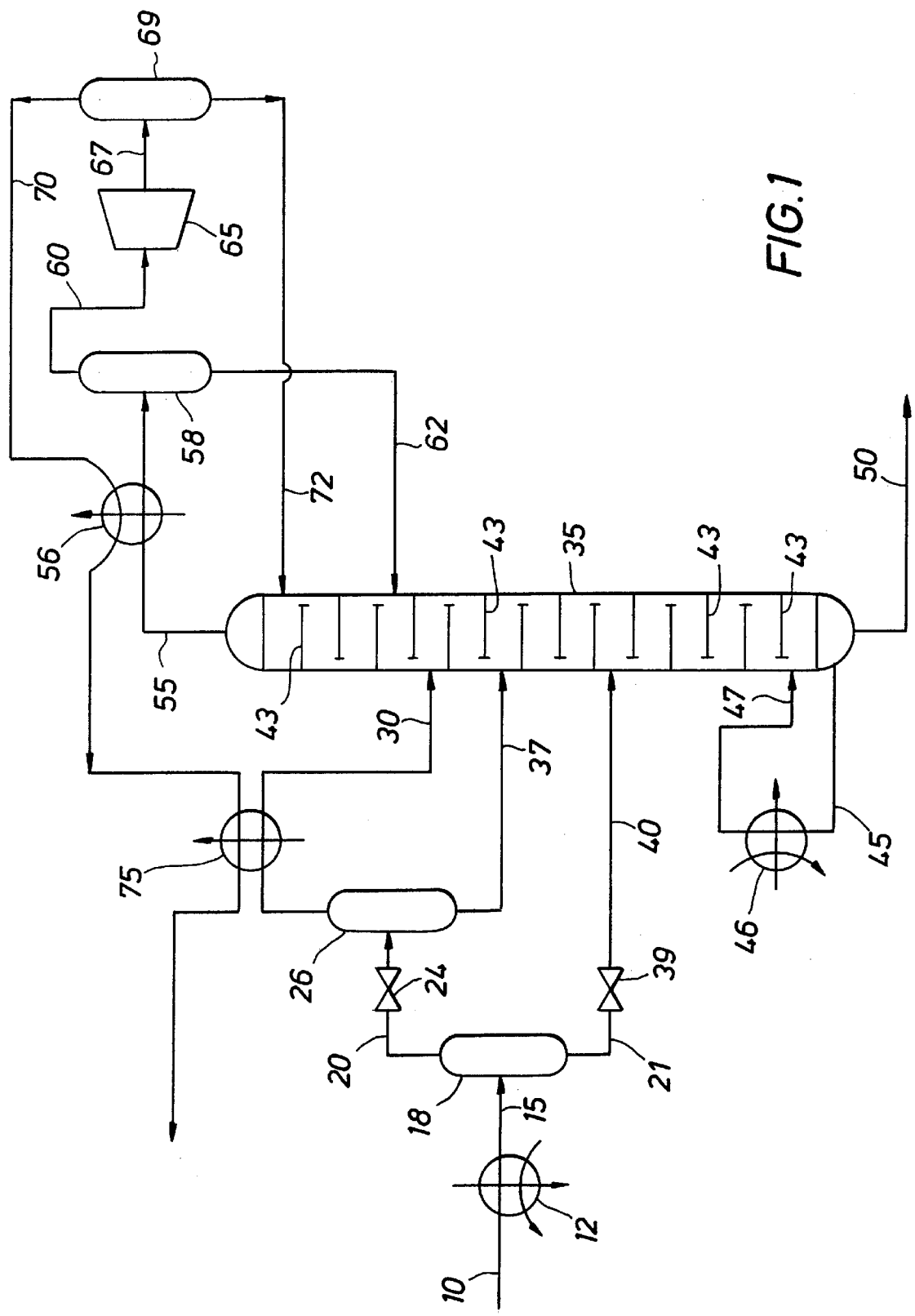
FIG. 1 shows a flow scheme of a plant for carrying out a first embodiment of the present invention.

Reference is made to FIG. 1 showing a first flow scheme of a plant for removing carbon dioxide, ethane and heavier components from a high pressure natural gas stream comprising methane, carbon dioxide, ethane and heavier components according to the present invention.

The high pressure natural gas stream delivered through conduit 10 is partly condensed in heat exchanger 12 by indirect heat exchange with an external refrigerant, and the obtained two-phase fluid is supplied through conduit 15 to a first separator 18. From the first separator 18 are removed a first gaseous stream through conduit 20 and a first liquid stream through conduit 21. The first gaseous stream is expanded in throttling valve 24 to obtain a partly condensed stream which is separated in a second separator 26 into a second gaseous stream and a second liquid stream. The second gaseous stream is the stream enriched in methane and carbon dioxide, which stream is introduced via conduit 30 into fractionation column 35, the second liquid stream is introduced into the fractionation column 35 via conduit 37, and the first liquid stream is expanded in throttling valve 39 and introduced into the fractionation column 35 via conduit 40. In this way from the high pressure natural gas stream are obtained a stream enriched in the lighter components methane and carbon dioxide and two liquid streams enriched in ethane and heavier components, and the three streams are introduced into the fractionation column 35.

The fractionation column includes a plurality of fractionation stages, here shown as fractionation trays 43, for the sake of clarity the openings in the trays have not been shown and not all fractionation trays are designated by a reference numeral.

The fluids are introduced into the fractionation column 35 at the pressure prevailing in the fractionation column, which is referred to as the fractionation pressure. The first liquid stream is introduced via conduit 40 into the fractionation column 35 at a level which is below the level of introducing the second gaseous stream via conduit 30, and the second liquid stream is introduced via conduit 37 into the fractionation column 35 at a level which is above the level of introducing the first liquid stream via conduit 40. For the sake of clarity the inlet devices have not been shown.

In order to supply heat to the lower part of the fractionation column 35, a fluid stream is removed from the fractionation column 35 below the levels of introducing the liquid streams, the fluid stream is heated to obtain a reboiling stream, and the reboiling stream is introducing into the fractionation column 35. In this case, liquid is withdrawn from the bottom of the fractionation column 35 through conduit 45, heated in heat exchanger 46 and introduced into the fractionation column via conduit 47. The level of introduction is below the levels of introducing the liquid streams via conduits 37 and 40.

Through conduit 50 is removed from the bottom of the fractionation column 35 a liquid stream enriched in ethane and heavier components, which stream further contains the removed carbon dioxide.

Through conduit 55 is removed from the top of the fractionation column a gaseous overhead stream enriched in methane. The gaseous overhead stream is cooled at fractionation pressure in heat exchanger 56 to obtain a two-phase fluid. In separator 58 the two-phase fluid into a cooled gaseous overhead stream removed through conduit 60 and a liquid stream. The liquid stream is introduced directly via conduit 62 as a first reflux stream into the fractionation column 35 at a level above the level of introducing the second gaseous stream via conduit 30.

The temperature to which the gaseous overhead stream is cooled in heat exchanger 58 is so selected that so much of the ethane condenses that a sufficiently large amount of carbon dioxide is removed with the condensing ethane. Carbon dioxide dissolved in the condensing ethane is returned to the fractionation column in the first reflux stream via conduit 62. The carbon dioxide concentration in the cooled gaseous overhead stream is so low that the carbon dioxide will not freeze at the lower temperatures encountered downstream.

The cooled gaseous overhead stream is passed through conduit 60 to a turbine expander 65, where the cooled gaseous overhead stream is expanded to a low pressure to obtain a two-phase fluid. The two-phase fluid is passed through conduit 67 to separator 69 where it is separated into a gaseous product stream enriched in methane and a liquid stream. The gaseous product stream is removed through conduit 70, and the liquid stream is introduced directly via conduit 72 as a second reflux stream into the top of the fractionation column 35 at a level above the level of introducing the first reflux stream via conduit 62.

Since expansion is accompanied by cooling, the temperature of the two-phase fluid in conduit 67 is below that of the cooled gaseous overhead stream in conduit 60. Thus the temperature of the second reflux stream is below that of the first reflux stream.

The reflux streams are introduced into the fractionation column 35 at a level which is above the level at which the second gaseous stream is introduced, and at a level at which the temperature prevailing in the fractionation column 35 matches the temperature of the reflux streams. As the second reflux stream is colder than the first one, the second reflux stream is introduced at a level which is above that of the first one, and suitably the second reflux stream is introduced into the top of the fractionation column 35.

The first reflux stream containing dissolved carbon dioxide is introduced at a relatively low level into the fractionation column 35, and thus the carbon dioxide is pushed down the fractionation column 35. The colder second reflux stream, which is moreover lean in carbon dioxide, is introduced at a higher level and serves as a solvent for carbon dioxide.

The pumps required to introduce the first and second reflux streams into the fractionation column 35 have not been shown.

The gaseous product stream is suitably passed through conduit 70 to the heat exchanger 56 to cool the gaseous overhead stream.

Additionally the gaseous product stream can be passed to heat exchanger 75 to cool the second gaseous stream removed from second separator 26. This removal of heat from the streams delivered to the fractionation column 35 is done to the expanded second gaseous stream so as to remove heat from the lightest part of the natural gas fed to the fractionation column 35 and thus to have the most efficient heat exchange.

Figure 2:
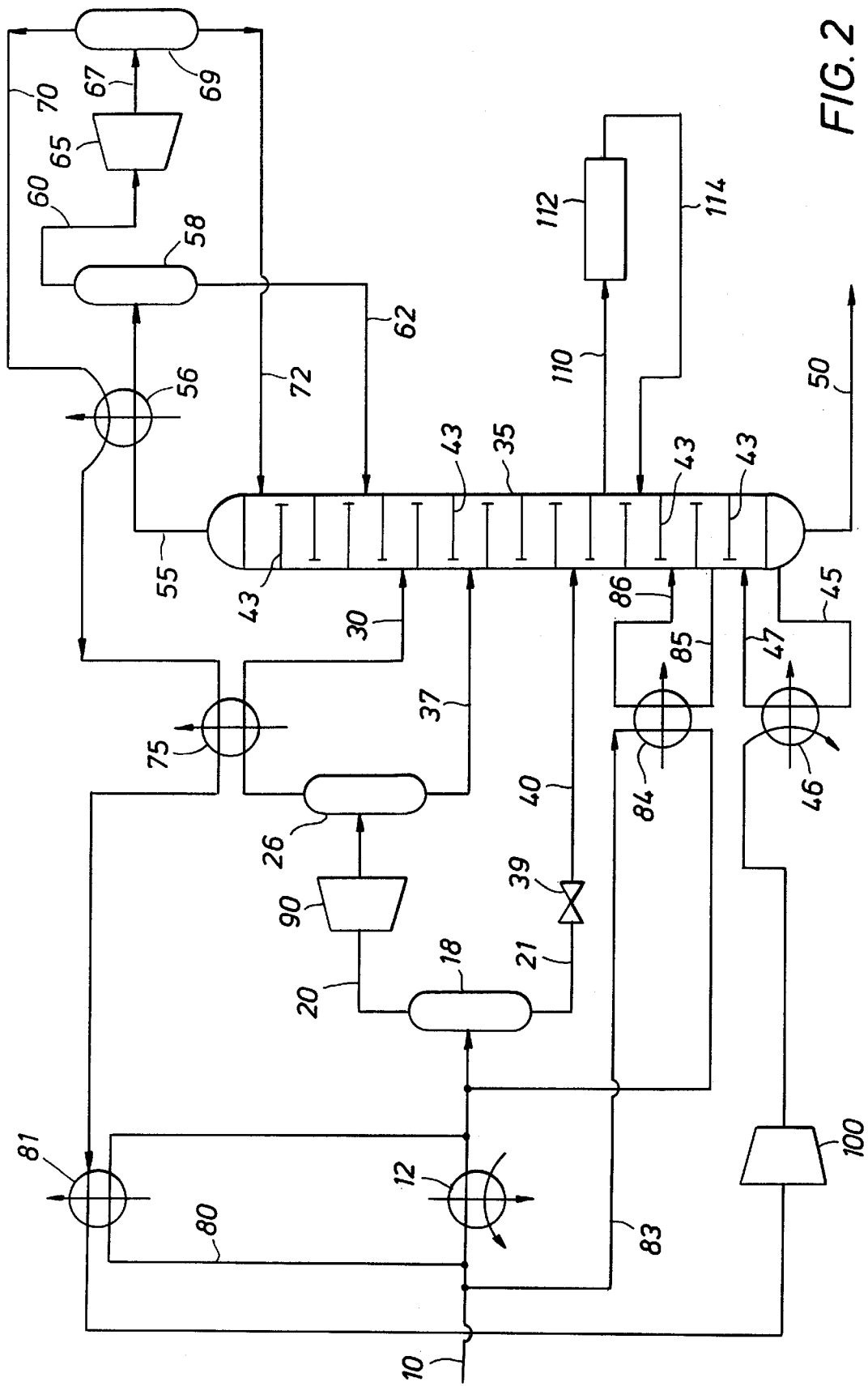
FIG. 2 shows an alternative to the plant of FIG. 1.

Reference is now made to FIG. 2 showing an alternative of the plant as shown in FIG. 1. Parts which are identical have got the same reference numerals as in FIG. 1.

The high pressure natural gas delivered through conduit 10 is split into three streams and these streams are separately cooled to obtain partly condensed streams at high pressure. The first of the three streams stream is passed through conduit 80 to a heat exchanger 81 in which that stream is partly condensed by indirect heat exchange with the gaseous product stream, the second stream is cooled in heat exchanger 12, and the third stream is passed through conduit 83 to heat exchanger 84 where it is cooled by indirect heat exchange with a fluid stream removed from the fractionation column 35. The latter fluid stream is removed through conduit 85 and introduced into the fractionation column 35 as a reboiling stream via conduit 86. The levels of removal and introduction are below the levels of introducing the liquid streams via conduits 37 and 40.

After being cooled the three partly condensed streams are combined, and the combined partly condensed stream is passed to the first separator 18. From the first separator 18 are removed the first gaseous stream through conduit 20 and the first liquid stream which latter stream is introduced at fractionation pressure into the fractionation column 35 via conduit 40.

The first gaseous stream is expanded in turbine expander 90 to obtain a partly condensed stream at lower pressure. This partly condensed stream is separated in the second separator 26 into a second gaseous stream removed through conduit 30 and a second liquid stream which latter stream is introduced at fractionation pressure into the fractionation column 35 via conduit 37 at a level above the level of introducing the first liquid stream via conduit 40.

The second gaseous stream by indirect heat exchange with the gaseous product stream in the heat exchanger 75, and it is introduced at fractionation pressure into the fractionation column above the level of introducing the second liquid stream.

Suitably the gaseous product stream is compressed in compressor 100 to pipeline pressure to obtain compressed product gas, and at least part of the heat of compression is removed from the compressed product gas by indirect heat exchange in heat exchanger 46 with part of the liquid stream removed through conduit 45 from the bottom of the fractionation column 35 to obtain a reboiling stream which is introduced into the fractionation column 35 via conduit 47.

Applicant had furthermore found that during normal operation the carbon dioxide concentration along the length of the fractionation column 35 is not constant, on the contrary, it passes through a maximum value at a level which is below the level of introducing the liquid streams via conduits 37 and 40. Since this maximum value is above the concentration of carbon dioxide in the liquid stream removed from the bottom of the fractionation column through conduit 50 it is advantageous to remove carbon dioxide from a stream withdrawn from the fractionation column 35 at the level corresponding to the largest carbon dioxide concentration. To this end a liquid stream is removed from the fractionation column 35 through conduit 110 (see FIG. 2), carbon dioxide is removed from this stream in a carbon dioxide removal plant 112, and a liquid stream having a reduced carbon dioxide concentration is introduced into the fractionation column via conduit 114.

The level of removing the carbon dioxide-rich stream is below the level of introducing the liquid stream(s), and the level of introducing the carbon dioxide-depleted stream is suitably below the level of removing the carbon dioxide-rich stream.

A plant for removing carbon dioxide from a liquid stream is known as such and will not be discussed here.

Suitably, turbine expander 65 can be replaced by a throttling valve.

Suitably the heat exchanger 56 can be supplemented with or replaced by a heat exchanger in which the gaseous overhead stream is cooled by indirect heat exchange with an external refrigerant.

The effect of the method of the present invention will now be shown with reference to the results of two calculations based on the flow scheme of FIG. 1. In both calculations the natural gas comprised nitrogen, carbon dioxide methane and ethane and heavier components.

Table 1 gives the flow rates of the components which enter the system and which leave the system for the method of the present invention, and Table 2 gives the temperatures, pressures, carbon dioxide concentration and total flow rate for some of the flows.

TABLE 1

Flow rates of the components in mol/s, the number in the top row refers to the number of the conduit in FIG. 1 (present invention).

| component | 10 | 50 | 70 |
|---|---|---|---|
| $N_2$ | 10 | — | 10 |
| $CO_2$ | 30 | 15 | 15 |
| $CH_4$ | 846 | 1 | 845 |
| $C_2+$ | 172 | 148 | 24 |
| Total | 1 058 | 164 | 894 |

TABLE 2

Data of several of the stream, the stream number refers to the number of the conduit in FIG. 1 (present invention).

| Stream | T in ° C. | P in MPa (absolute) | mol % CO2 | flow rate in mol/s |
|---|---|---|---|---|
| 10 | 19 | 5.42 | 2.8 | 1058 |
| 55 | −78 | 3.00 | 2.2 | 967 |
| 62 | −81 | 2.95 | 6.0 | 37 |
| 60 | −81 | 2.95 | 2.0 | 930 |
| 72 | −90 | 2.28 | 6.8 | 30 |
| 70 | −90 | 2.28 | 1.6 | 900 |
| 50 | 20 | 2.95 | 9.1 | 164 |

Results of the calculations of the method as disclosed in U.S. Pat. No. 4,444,577 are below. This method differs from the present invention in that the gaseous overhead stream (in conduit 55) is directly supplied to the expansion turbine (65); this direct supply is indicated in Table 4 by stream 55–60.

Table 3 gives the flow rates of the components which enter the system and which leave the system for the method according to the present invention, and Table 4 gives the temperatures, pressures, carbon dioxide concentration and total flow rate for some of the flows.

TABLE 3

Flow rates of the components in mol/s, the number in the top row refers to the number of the conduit in FIG. 1 (prior art).

| component | 10 | 50 | 70 |
|---|---|---|---|
| $N_2$ | 10 | — | 10 |
| $CO_2$ | 30 | 11 | 19 |
| $CH_4$ | 846 | 1 | 845 |
| $C_2+$ | 172 | 135 | 37 |
| total | 1 058 | 147 | 911 |

TABLE 4

Data of several of the stream, the stream number refers to the number of the conduit in FIG. 1 (prior art).

| Stream | T in ° C. | P in MPa (absolute) | mol % CO2 | flow rate in mol/s |
|---|---|---|---|---|
| 10 | 19 | 5.42 | 2.8 | 1058 |
| 55–60 | −78 | 2.95 | 2.5 | 943 |
| 72 | −88 | 2.13 | 7.2 | 35 |
| 70 | −88 | 2.13 | 2.2 | 908 |
| 50 | 21 | 2.95 | 7.4 | 150 |

From a comparison of the data in Tables 1 and 3 can be concluded that with the method of the present invention more carbon dioxide is removed: with the liquid bottom stream 50 is removed 15 mol $CO_2$/s (invention) against 11 mol $CO_2$/s (prior art). A reason is that there is less carbon dioxide in the gaseous stream 60 supplied to the turbine expander 65 with the process of the invention than with the prior art process (see Tables 2 and 4), and consequently a lower temperature of the stream supplied to separator 69 can be obtained without freezing.

From a comparison of the data in Tables 1 and 3 can also be concluded that with the method of the present invention more ethane and heavier components are removed: with the liquid bottom stream 50 is removed 148 mol $C_2+$/s (invention) against 135 mol $C_2+$/s (prior art).

The above examples show that a significant improvement in removal of carbon dioxide and ethane and heavier components from natural gas can be obtained with the method according to the present invention.

We claim:

1. A method of removing carbon dioxide, ethane and heavier components from a high pressure natural gas stream comprising methane, carbon dioxide, ethane and heavier components, the method comprising the steps of:
   (a) partly condensing and expanding the high pressure natural gas stream to obtain a stream enriched in methane and carbon dioxide and at least one liquid stream enriched in ethane and heavier components;
   (b) introducing the stream enriched in methane and carbon dioxide at fractionation pressure into a fractionation column which includes a plurality of fractionation stages;
   (c) introducing the liquid stream(s) at fractionation pressure into the fractionation column at a level which is below the level of introducing the stream enriched in methane and carbon dioxide;
   (d) removing from the fractionation column, below the level of introducing the liquid stream(s), at least one fluid stream, heating the fluid stream(s) to obtain reboiling stream(s), and introducing the reboiling stream(s) into the fractionation column;
   (e) removing from the bottom of the fractionation column a liquid stream enriched in carbon dioxide, ethane and heavier components;
   (f) removing from the top of the fractionation column a gaseous overhead stream enriched in methane,
   (g) cooling the gaseous overhead stream at fractionation pressure to obtain a two-phase fluid, separating the two-phase fluid into a cooled gaseous overhead stream and a liquid stream, and introducing the liquid stream as a first reflux stream into the fractionation column at a level above the level of introducing the stream enriched in methane and carbon dioxide; and
   (h) expanding the cooled gaseous overhead stream to obtain a two-phase fluid at low pressure, separating the two-phase fluid into a gaseous product stream and a liquid stream, and introducing the liquid stream as a second reflux stream into the fractionation column at a level above the level of introducing the first reflux stream.

2. The method of claim 1 wherein the gaseous overhead stream is cooled by indirect heat exchange with the gaseous product stream.

3. The method of claim 1 wherein the stream enriched in methane and carbon dioxide at fractionation pressure is cooled by indirect heat exchange with the gaseous product stream before the stream is introduced into the fractionation column.

4. The method of claim 1 wherein part of the high pressure natural gas stream is cooled by indirect heat exchange with the gaseous product stream.

5. The method of claim 4 wherein the remainder of the high pressure natural gas stream is cooled by indirect heat exchange with a stream selected from the group of refrigerant, at least one of the at least one fluid streams removed from the fractionation column in step (d), and a combination of the two.

6. The method of claim 1 wherein the gaseous product stream is compressed to pipeline pressure to obtain compressed product gas.

7. The method of claim 6 wherein at least part of the heat of compression is removed from the compressed product gas by indirect heat exchange with part of the liquid stream removed from the bottom of the fractionation column to obtain a reboiling stream which is introduced into the fractionation column.

8. The method of claim 1 wherein steps (a), (b) and (c) comprise cooling at least part of the high pressure natural gas stream by indirect heat exchange with the gaseous product stream and cooling the remainder by indirect heat exchange with a stream selected from the group comprising a refrigerant, at least one of the fluid stream(s) removed from the fractionation column in step (d), and combinations thereof, to obtain partly condensed stream(s) at high pressure; combining the partly condensed streams; separating the combined partly condensed streams into a first gaseous stream and a first liquid stream which latter stream is introduced at fractionation pressure into the fractionation column; expanding the first gaseous stream to obtain a partly condensed stream at lower pressure; separating the partly condensed stream into a second gaseous stream and a second liquid stream which latter stream is introduced at fractionation pressure into the fractionation column at a level above the level of introducing the first liquid stream; cooling the second gaseous stream by indirect heat exchange with the gaseous product stream, and introducing cooled second gaseous stream at fractionation pressure into the fractionation column above the level of introducing the second liquid stream.

9. The method of claim 8 wherein the gaseous product stream is compressed to pipeline pressure to obtain compressed product gas, and wherein at least part of the heat of compression is removed from the compressed product gas by indirect heat exchange with part of the liquid stream removed from the bottom of the fractionation column to obtain a reboiling stream which is introduced into the fractionation column.

10. The method of claim 1 which further comprises removing from the fractionation column below the level of introducing the liquid stream(s) in step (c) a liquid stream, removing carbon dioxide from this liquid stream to obtain a liquid stream having a reduced carbon dioxide concentration, and introducing into the fractionation column the liquid stream having a reduced carbon dioxide concentration into the fractionation column.

* * * * *